US008255022B2

(12) United States Patent
Schneider et al.

(10) Patent No.: US 8,255,022 B2
(45) Date of Patent: Aug. 28, 2012

(54) CRYOSTAT HAVING A MAGNET COIL SYSTEM, WHICH COMPRISES AN UNDER-COOLED LTS SECTION AND AN HTS SECTION ARRANGED IN A SEPARATE HELIUM TANK

(75) Inventors: Theo Schneider, Eggenstein-Leopoldshafen (DE); Gerhard Roth, Rheinstetten (DE); Arne Kasten, Karlsruhe (DE)

(73) Assignees: Bruker Biospin GmbH, Rheinstetten (DE); Forschungszentrum Karlsruhe GmbH, Karlsruhe (DE)

( * ) Notice: Subject to any disclaimer, the term of this patent is extended or adjusted under 35 U.S.C. 154(b) by 968 days.

(21) Appl. No.: 12/225,188

(22) PCT Filed: Mar. 7, 2007

(86) PCT No.: PCT/EP2007/001925

§ 371 (c)(1), (2), (4) Date: Sep. 16, 2008

(87) PCT Pub. No.: WO2007/107239

PCT Pub. Date: Sep. 27, 2007

(65) Prior Publication Data

US 2009/0291850 A1 Nov. 26, 2009

(30) Foreign Application Priority Data

Mar. 18, 2006 (DE) ........................ 10 2006 012 511

(51) Int. Cl.

| | |
|---|---|
| ***H01F 6/04*** | (2006.01) |
| ***H01F 6/06*** | (2006.01) |
| ***G01V 3/00*** | (2006.01) |

(52) U.S. Cl. ........ 505/163; 505/210; 335/216; 335/296; 324/318; 62/51.1

(58) Field of Classification Search .................. 505/163, 505/211, 433, 705, 844, 879, 885, 892, 951; 335/216–217, 296–301; 324/318–320; 62/51.1
See application file for complete search history.

(56) References Cited

U.S. PATENT DOCUMENTS

| | | | | |
|---|---|---|---|---|
| 4,924,198 | A * | 5/1990 | Laskaris | 505/211 |
| 5,150,578 | A * | 9/1992 | Oota et al. | 62/47.1 |
| 2006/0066429 | A1* | 3/2006 | Kasten | 335/296 |

FOREIGN PATENT DOCUMENTS

| | | |
|---|---|---|
| DE | 201 13 547 | 3/2002 |
| DE | 10 2004 007340 | 9/2005 |
| EP | 0 406 862 | 1/1991 |

OTHER PUBLICATIONS

Kiyoshi et al, “Superconducting Inserts in High-Field Solenoids”, IEEE Transactions on Applied Superconductivity, US, vol. 12, No. 1, Mar. 2002, pp. 470-475.*

* cited by examiner

*Primary Examiner* — Stanley Silverman
*Assistant Examiner* — Kallambella Vijayakumar
(74) *Attorney, Agent, or Firm* — Paul Vincent

(57) ABSTRACT

A cryostat (1) with a magnet coil system including superconductors for the production of a magnet field $B_0$ in a measuring volume (3) has a plurality of radially nested solenoid-shaped coil sections (4, 5, 6) which are electrically connected in series, at least one of which being an LTS section (5, 6) with a conventional low temperature superconductor (LTS) and at least one of which being an HTS section (4) including a high temperature superconductor (HTS), wherein the LTS section (5, 6) is located in a first helium tank (9) of the cryostat (1) along with liquid helium at a helium temperature $T_L$<4 K. The apparatus is characterized in that the HTS section (4) is disposed radially within the LTS section (5, 6) in a separate helium tank (19) of the cryostat (1) having normal liquid helium and is separated from the LTS section (5, 6) by means of at least one wall disposed between the two helium tanks. An HTS coil section can be maintained in the cryostat in accordance with the invention over a long period of time and in a reliable fashion.

15 Claims, 1 Drawing Sheet

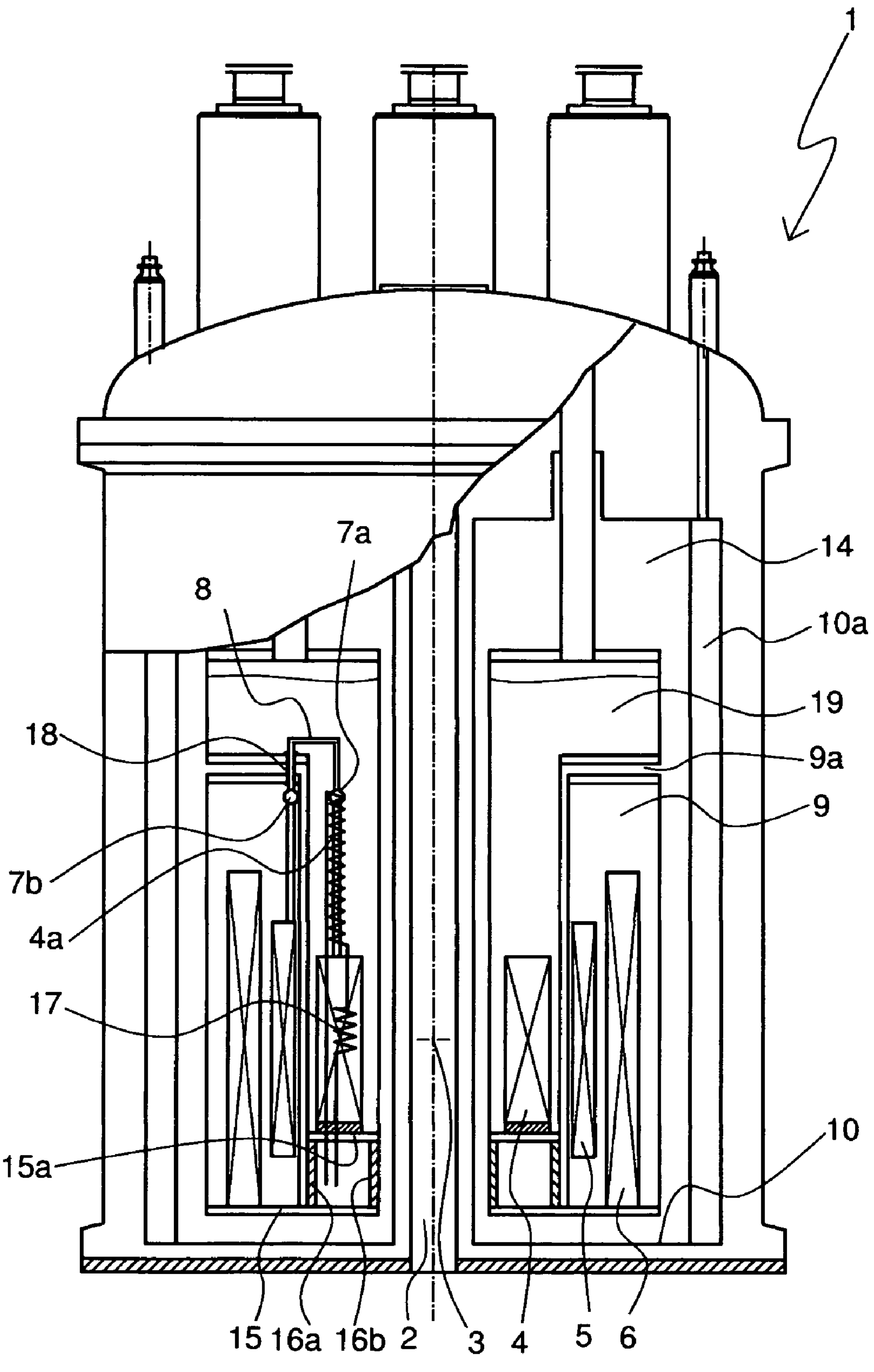
1
14
10a
19
9a
9
10
7a
8
18
7b
4a
17
15a
15
16a
16b
2
3
4
5
6

CRYOSTAT HAVING A MAGNET COIL SYSTEM, WHICH COMPRISES AN UNDER-COOLED LTS SECTION AND AN HTS SECTION ARRANGED IN A SEPARATE HELIUM TANK

This application is the national stage of PCT/EP2007/001925 filed on Mar. 7, 2007 and also claims Paris Convention priority to DE 10 2006 012 511.8 filed Mar. 18, 2006.

BACKGROUND OF THE INVENTION

The invention concerns a cryostat having a magnetic coil system including superconducting materials for generation of a magnetic field $B_0$ within a measurement volume, the magnet system having a plurality of radially nested solenoid-shaped coil sections connected in series at least one of which is an LTS section of a conventional low temperature superconductor (LTS) and with at least one HTS section of a high temperature superconductor (HTS), wherein the LTS portion is located in a helium tank of the cryostat having liquid helium at a helium temperature $T_L$<4K.

Cryostats of this kind are e.g. disclosed in DE 10 2004 007 340 A1.

By way of example, nuclear magnetic resonance systems, in particular spectrometers, require very strong, homogenous and stable magnetic fields. The stronger the magnetic field, the better the signal to noise ratio as well as the spectral resolution of the NMR measurement.

Superconducting magnet coil systems are used to produce strong magnetic fields. Magnetic coil systems having solenoid-shaped coil sections are widely used which are nested within each other and operated in series. Superconductors can carry electrical current without losses. The superconducting condition is established below the material-dependent transition temperature. Conventional low temperature superconductors (LTS) are normally utilized for the superconducting material. These metallic alloys, such as NbTi and $Nb_3S$, are relatively easy to process and are reliable in application. An LTS coil-portion conductor usually comprises a normally conducting metallic matrix (e.g. copper) in which superconducting filaments are embedded and which, during normal operation, completely carry the current. In the case of NbTi, these are usually several tens or hundreds of filaments; in the case of $Nb_3Sn$, the filament number could be more than one hundred thousand. Although the internal construction of the conductor is actually somewhat more complex, this is irrelevant within the present context.

The coil sections are cooled with liquid helium within a cryostat in order to cool the superconducting portions below the transition temperature. The superconducting coil sections are thereby at least partially immersed in the liquid helium. For magnets generating the highest fields, the coil sections are, if appropriate, operated using undercooled helium at a temperature beneath 4 K, which even further increases their current carrying capability and their critical magnetic field. The temperature can thereby be at or below the so-called lambda point (approximate 2.2 K) at which the liquid helium becomes superfluid.

In order to even further increase the magnetic field strength of the magnetic coil system it is desirable to also utilize a high temperature superconductor (HTS). For a given temperature, conductors, which include HTS, can carry much more current and thereby achieve higher magnetic field strengths than those with LTS. HTS materials are thereby appropriate for use in the inner most coil sections of a magnetic coil system.

HTS or ceramic superconductors are currently primarily made from bismuth conductors with HTS filaments within a silver matrix. The conductors are usually stripe or band-shaped.

Coil sections made from HTS have turned out to be unreliable and susceptible to short lifetimes, particularly in undercooled helium. Investigation of defective HTS portions has shown that the HTS material is split open, thereby destroying the current carrying capability of the HTS conductor. This effect, which is also known in other context, is occasionally referred to as “ballooning”.

It is accordingly the purpose of the present invention to present a cryostat in which HTS coil portions enjoy a long lifetime and can be utilized in a reliable manner, in particular, while reducing the risk of ballooning.

SUMMARY OF THE INVENTION

This purpose is achieved by means of a cryostat of the above mentioned kind which is characterized in that the HTS section is disposed radially within the LTS section in a separate cryostat helium tank having normal liquid helium and is separated from the LTS section by means of at least one wall disposed between the two helium tanks.

In accordance with the present invention, it has been discovered that the ballooning is caused by undercooled and at least partially superfluid helium, which penetrates into the HTS material where it expands or evaporates. HTS material is ceramic and therefore has a certain porosity. Liquid helium can pass through the pores into the inner portions of the HTS material. In particular, in a superfluid state of helium, which obtains below the $\lambda$ point temperature of approximately 2.2 K (and also at temperatures slightly higher than 2.2 K due to fluctuations), helium can pass through the smallest of gaps. In the event that subsequently heats beyond the evaporation point, it then expands rapidly in volume during evaporation. If the warming occurs too rapidly, the evaporating helium cannot escape quickly enough from the porous material and a substantial amount of pressure is built up within the pores of the HTS. Since the HTS material is ceramic and relatively brittle, the HTS can be explode in consequence of this pressure.

All these effects can be prevented with the cryostat configuration in accordance with the invention. The HTS section or sections of the magnetic coil system and thereby all of the HTS material is disposed in a separate helium tank of the cryostat between the inner wall of the first helium tank and the room temperature bore. No superfluid helium is present in the separate helium tank.

The operating temperature of the HTS can thereby be somewhat higher than the LTS section in the first helium tank, since, in contrast to the situation for the LTS sections, the critical current of the HTS conductor is only weakly dependent on temperature at or below 4 K.

In an advantageous embodiment of the cryostat in accordance with the invention, the temperature of the liquid helium in the first tank $T_L$<2.5 K, in particular <2.2 K. At this low temperature, the danger of ballooning is particularly high without the measures in accordance with the invention so that the advantages of the invention are particularly great. Since the critical current density of the conductor of the LTS section increases with lower temperature, the lower temperatures enable higher magnetic field strengths $B_0$ and/or more compact LTS sections.

In a preferred embodiment of the cryostat in accordance with the invention, the superconducting leads to at least one HTS section also travel in the separate helium tank, at least to the extent that the leads contain HTS material. In this manner, all HTS materials, including the joints, are protected from superfluid liquid helium. Conductors generally made from a conventional superconducting material, e.g. a NbTi multi-filament wire, extend from these joints to a feed through and into the first helium tank The superconductor is passed through this feed-through so that the complete magnetic current can flow to and from the HTS and LTS sections without loss. A superconducting switch for loss free persistent current mode operation is normally located in the separate helium tank: with vertically disposed magnet coils, above the LTS section.

In accordance with a further advantageous embodiment, at least one radiation shield is disposed between the separate helium tank and the room temperature bore. The radiation shield reduces the passage of radiative heat from the room temperature bore into the HTS section. In a particular preferred embodiment of the invention, the magnetic field produced by the magnet coil system in the measurement volume $B_0$>20 T, in particular >23 T. These strong magnetic fields can easily be achieved with the HTS section and the cryostat in accordance with the invention. In contrast thereto, conventional magnet systems that only have LTS-based sections already reach the theoretical limit at these field strengths, having a critical current density which approaches 0.

In a further preferred embodiment, the coil sections of the magnetic coil system are superconducting short circuited (persistent current mode) during operation. This leads to a particularly stable time dependence of the magnetic field $B_0$.

In a further preferred embodiment, the magnetic coil system has a magnetic field $B_0$ homogeneity in the measurement volume and a time stability for the magnetic field $B_0$ that satisfy the requirements for high resolution NMR spectroscopy.

In a preferred embodiment, the separate helium tank has a temperature for the liquid helium contained therein of approximately 4.2 K. This makes refilling of the tank particularly simple and safe.

The separate helium tank is preferentially separated from the first by means of a vacuum barrier, however, is connected to the first helium tank (see for example U.S. Pat. No. 5,220, 800).The liquid helium in the first helium tank has a temperature of $T_L$<4 K. The use of two helium tanks permits the LTS section to be operated at a lower temperature, which leads to higher current capability. Moreover, helium evaporates from the cryostat under normal pressure and therefore both tanks can be refilled at normal pressures. This increases the efficiency of the cooling and the operational safety.

In a preferred improvement, the separate helium tank is partially disposed above the helium tank about a common, preferably vertical room temperature bore. In this configuration, both tanks can be separated by a vacuum barrier and coupled through a narrow e.g. gap-shaped connection. The upper tank can be located at normal pressure or slightly above so that, in total, the refilling of helium is easier and safer.

In order to prevent the tanks with the sections disposed therein from vibrating relative to each other, which would negatively affect the stability of measurements, the tanks can be rigidly connected to each other. This can be done via the suspension of the tanks within the cryostat or preferentially through a thermally poorly conducting spacer, if appropriate, with point-like contact using materials which are known in the art of cryostat construction. If the thermal connections thereby occurring can be acceptable, the sections or their supports can also be mounted to a common floor plate or support structure made e.g. from steel or titanium which is part of the helium tank or thermally connected thereto.

The sections or their supports can be rigidly connected to the tank. Towards this end, it can be sufficient when the connected LTS sections seat on the floor of the first tank and the HTS section on the floor of the separate tank.

Further advantages of the invention can be derived from the description of the drawings. The above-mentioned features and those to be discussed below can be utilized in accordance with the invention individually or collectively in arbitrary combination. The embodiments shown and described are not to be considered exhaustive enumeration, rather have exemplary character only for illustrating the invention.

BRIEF DESCRIPTION OF THE DRAWING

The invention is represented in the drawing and is further explained with reference to embodiments.

FIG. 1 shows a schematic representation of a first embodiment of a cryostat in accordance with the invention having an LTS section and an HTS section disposed in separate helium tanks;

DESCRIPTION OF THE PREFERRED EMBODIMENT

FIG. 1 shows an embodiment of a cryostat 1 in accordance with the invention. The cryostat 1 has a room temperature bore 2 in which a measuring volume 3 for a sample is provided. The measuring volume 3 is located in the center of a magnetic coil system, which is formed by three solenoid-shaped coil section 4, 5, 6. The radially innermost coil section 4 has a winding made from high temperature superconductor (HTS). The middle coil section 5 is wound with $Nb_3Sn$ wire and the outer most coil section 6 is wound with NbTi wire. The coil sections 5, 6 therefore represent low temperature superconductor (LTS) coil sections. The coil sections 4, 5, 6 are electrically connected to each other in series, as is shown in an exemplary fashion by means of superconducting joints 7*a* and 7*b*. At joint 7*a*, the high HTS material of a lead 4*a* is connected to a HTS coil section 4 by means of an adaptor section 8 made from NbTi. At joint 7*b*, the adaptor member 8 is connected to the $Nb_3Sn$ wire of the LTS section 5. The transition piece 8 passes through a feed-through in a vacuum barrier 9*a* between the first helium tank 9, in which the mutually nested LTS sections 5 and 6 are located, and a separate helium tank 19 in which the HTS section 4 is located. The feed-through 18 connects the two tanks 9, 19 and is sealed with respect to the vacuum 14 of the cryostat.

The first helium tank 9 is filled with liquid helium. The liquid helium in the helium tank 9 has a temperature $T_L$<4 K, in particular about 2 K. For insulation purposes, the helium tank 9 is surrounded by a radiation shield 10, in particular, in a radially outer direction. The radiation shield 10 also extends between the HTS section 4 and the room temperature bore 2. The radiation shield 10 is cooled with liquid nitrogen, which is filled into a container 10*a*. Additional radiation shields can also be provided for which are usually cooled by the evaporating helium gas. A radiation shield can also be directly thermally coupled to the separate helium tank 19 and substantially surround the first tank 9. Alternatively or in addition thereto, the radiation shields can be cooled by refrigerators, wherein the nitrogen tank 10 can then be eliminated. The refrigerator can also re-cool the evaporated helium so that the refilling interval for liquid helium can be increased or such that the refilling of helium is only necessary following a break down.

The LTS coil sections 5, 6 can be immersed in superfluid liquid helium. The HTS sections 4, including the leads 4*a* and the joints 7a, are disposed in a separate helium tank 19 which only contains normal liquid or gaseous helium. In this manner, no superfluid liquid helium can flow into the HTS material of the HTS coil sections 4 or their leads 4a. In consequence thereof, one prevents superfluid liquid helium from evaporating within the HTS material, thereby leading to an increased volume within the HTS material and possible rupturing thereof.

If during operation, the temperature in the separate helium tank 19 should fall substantially below 4 K, a heater 17 is provided for the HTS section 4 including leads 4a and a joint 7a so that, under no circumstances, can superfluid helium be present in the separate tank 19.

The overall evacuated inner region of cryostat 1 constitutes the vacuum portion 14 of the cryostat. A pressure of less than $10^{-5}$ mbar is present in vacuum portion 14.

It is normally permissible for the HTS section 4 to be somewhat warmer than the LTS sections 5 and 6.

A radially outer portion of a floor plate 15 forms the lower wall of the helium tank 9. The floor plate 15 extends in a radially inward direction up to beneath the HTS section 4. Two ring flanges 16a, 16b are attached to the floor plate 15. The LTS section 6 is directly attached to the floor plate 15 and the LTS section 5 is indirectly attached thereto by means of a coil support (not shown). The floor plate 15 is rigidly connected to the floor plate 15a of the separate helium tank 19, to which the HTS section 4 is firmly connected, by means of thermally poorly conducting ring flanges 16a, 16b. The floor plate 15 is preferentially formed from a single piece.

This configuration permits simultaneous handling of all coil sections 4, 5 and 6 during assembly of the cryostat 1 by means of the common floor plate 15.

The cryostats 1 of figure is preferentially parts of an NMR apparatus such as an NMR spectrometer or an NMR tomography apparatus, in particular, a high field NMR spectrometer having a magnetic field in the measuring volume $B_0$>20 T, preferentially >23 T, wherein the magnetic coil system satisfies the requirements of high resolution NMR spectroscopy with regard to the magnetic field $B_0$ homogeneity in the measuring volume and the temporal stability of $B_0$, which, in general requires that the coil sections of the magnetic coil system be operated in persistent current mode. As is shown in the examples, the coil axes and the room temperature bore are normally vertical. The invention, however, also concerns cryostats having horizontal bores which are preferentially utilized in imaging applications (MRI) or for ion cyclotron resonance from spectrometers.

We claim:

1. A cryostat and magnet coil system, the magnet coil system having a plurality of radially nested superconducting solenoid-shaped coil sections, the coil sections being electrically connected in series for production of a magnet field $B_0$ in a measuring volume, the cryostat and magnet coil system comprising:

a first helium tank;

a first volume of liquid helium disposed within said first helium tank, said first volume of liquid helium having a temperature $T_L$<4 K;

an LTS coil section of said magnet coil system of a conventional low temperature superconductor (LTS) disposed in said helium tank at said helium temperature $T_L$;

a second helium tank;

a second volume of liquid helium disposed within said second helium tank, said second volume of liquid helium having a temperature $T_H$>2.2 K;

at least one HTS section of said magnet coil system having a high temperature superconductor (HTS), said HTS section disposed within said second helium tank, radially within said LTS section; and at least one wall disposed between said first and said second helium tanks to separate said HTS and said LTS sections.

2. The cryostat of claim 1, wherein a temperature of liquid helium in said first helium tank $T_L$<2.5 K or <2.2 K.

3. The cryostat of claim 1, wherein a temperature of liquid helium in said second tank $T_H$>2.5 K or >4 K.

4. The cryostat of claim 1, wherein a heater is disposed in said second helium tank.

5. The cryostat of claim 1, wherein said first and said second helium tanks are separated by a vacuum barrier.

6. The cryostat of claim 1, wherein superconducting leads or joints that travel to the at least one HTS section in said second helium tank, are located inside said second helium tank at least to an extent that those leads or joints contain HTS.

7. The cryostat of claim 1, wherein said first and said second helium tanks are mechanically rigidly connected to each other by poorly thermally conducting means, to substantially prevent vibrations of the coil sections with respect to each other.

8. The cryostat of claim 1, wherein the coil sections are mechanically rigidly connected to said first and said second helium tanks to substantially prevent vibrations of the coil sections with respect to each other.

9. The cryostat of claim 1, wherein the magnet coil system surrounds a vertical axis.

10. The cryostat of claim 1, wherein the cryostat defines a room temperature bore having said measurement volume and surrounded by the magnet coil system.

11. The cryostat of claim 10, further comprising at least one radiation shield disposed between said second helium tank and said room temperature bore.

12. The cryostat of claim 1, wherein the magnet coil system produces a magnetic field $B_0$ in said measurement volume, which is larger than 20 T or larger than 23 T.

13. The cryostat of claim 1, wherein the coil sections of the magnet coil system are operated in persistent current mode.

14. The cryostat of claim 10, wherein the magnet coil system fulfills requirements of high resolution NMR spectroscopy with regard to a homogeneity as well as a temporal stability of the magnetic field $B_0$ in the measurement volume.

15. A cryostat and magnet coil system, the magnet coil system having a plurality of radially nested superconducting solenoid-shaped coil sections, the coil sections being electrically connected in series and operated in persistent current mode for production of a magnet field $B_0$ in a measuring volume, the cryostat and magnet coil system comprising:

a first helium tank for holding liquid helium at a helium temperature TL<2.2 K;

a first volume of liquid helium disposed within said first helium tank, said first volume of liquid helium having a temperature TL <2.2 K;

an LTS coil section of said magnet coil system of a conventional low temperature superconductor (LTS) disposed in said helium tank at said helium temperature TL;

a second helium tank holding normal liquid helium;

a second volume of liquid helium disposed within said second helium tank, said second volume of liquid helium having a temperature TH>4 K;

at least one HTS section of said magnet coil system having a high temperature superconductor (HTS), said HTS section disposed within said second helium tank, radially within said LTS section; and at least one wall disposed between said first and said second helium tanks to separate said HTS and said LTS sections, both helium tanks being separated from each other by a vacuum barrier and being mechanically rigidly connected to each other by poorly thermally conducting means, wherein superconducting leads or joints that travel to the at least one HTS section in said second helium tank are located inside said second helium tank at least to an extent that those leads or joints contain HTS.

* * * * *